United States Patent Office 3,576,733
Patented Apr. 27, 1971

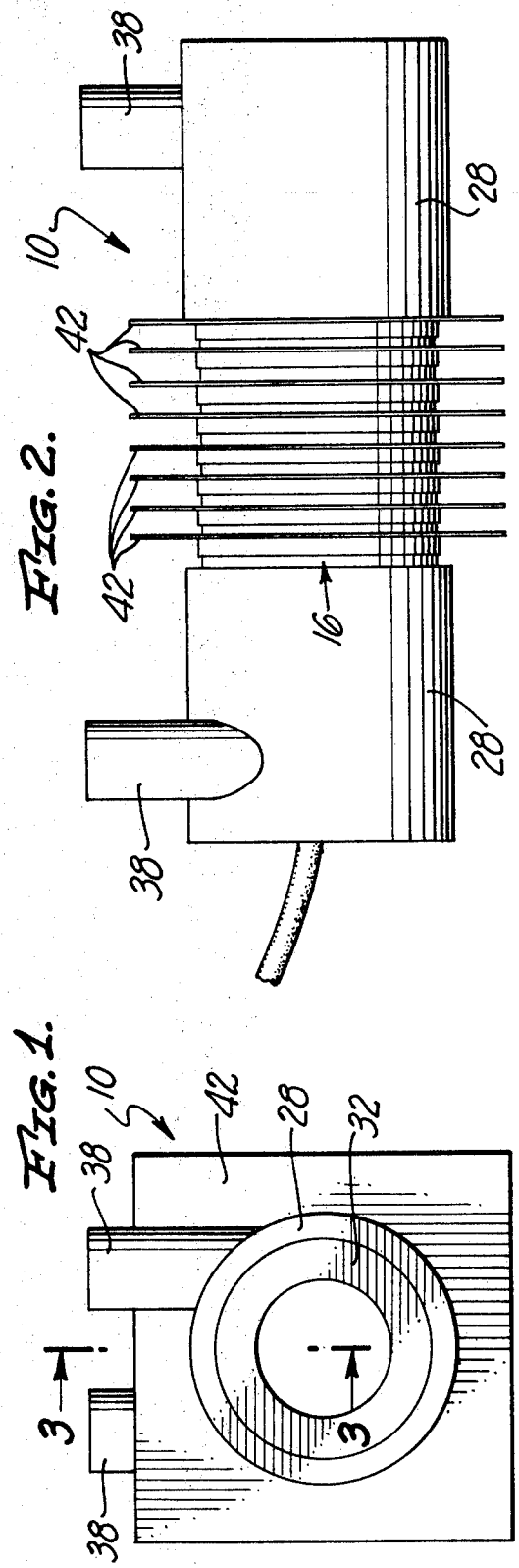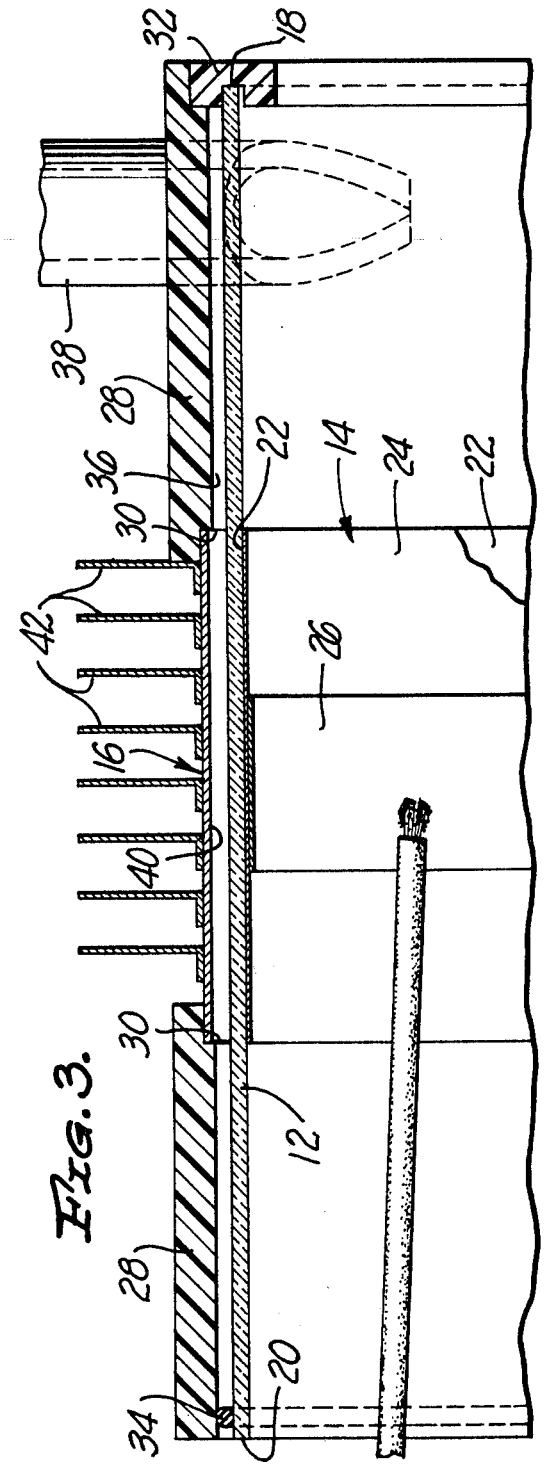
INVENTOR
STUART W. BEITZEL
BY
EDWARD D. O'BRIAN
ATTORNEY

3,576,733
OZONIZERS
Stuart W. Beitzel, Santa Monica, Calif., assignor to
Puromatic, Inc.
Filed Oct. 29, 1968, Ser. No. 771,456
Int. Cl. C01b 13/12
U.S. Cl. 204—320                    5 Claims

ABSTRACT OF THE DISCLOSURE

A silent ozonizer is disclosed which includes a cylindrical dielectric tube carrying a first electrode on its interior between its ends. A housing means including a second electrode is located around the dielectric tube so as to define a tubular channel extending between the two electrodes. Means are provided for introducing and removing the gas tangentially from the opposite ends of the channel. Preferably the dielectric tube is a transparent tube which is directly contacted by the first electrode and the second electrode is of a metal which acts as and/or which carries a catalyst for the production of ozone. Such a catalyst may be used in a differently constructed ozonizer; similarly such a transparent dielectric tube may be utilized between electrodes in other differently constructed silent ozonizers.

CROSS-REFERENCE TO RELATED APPLICATIONS

An ozonizer as disclosed in this application is intended to be utilized in the production of ozone in conjunction with a power source as described in the co-pending Miller application Ser. No. 501,954 filed Oct. 22, 1965, now U.S. Pat. 3,455,803, entitled "Ozone Producing Apparatus and Method" as a tube for the production of ozone.

BACKGROUND OF THE INVENTION

The term "ozonizer" has been adopted and used to designate structures in which ozone is created from normal oxygen by passing either normal oxygen alone or admixed with another gas or other gasses as in air between two opposed electrodes as such electrodes are oppositely charged so as to create an electric field between them. In so-called silent ozonizers these electrodes are separated by a dielectric material, and the charges on the electrodes are regulated so that ozone is produced without actual assimilation occurring between the electrodes through the dielectric.

A large number of different types of ozonizers and silent ozonizers have been developed and utilized in the past. Many of such devices have operated satisfactorily in the production of ozone. However, as a class such prior devices or ozonizers have been limited in their acceptability because of either one or both of two different factors.

One of these relates to the amount of ozone which can be formed per time interval per unit of electrode area. The other pertains to the amount of ozone which can be formed per unit of power consumed. Both of these factors enter into what may be considered under the broad term "efficiency." It is normally desired to utilize ozonizers which have a relatively high ozone production capacity per unit of size and which are relatively efficient per unit of power required in the production of ozone.

SUMMARY OF THE INVENTION

An object of this invention is to provide new and improved ozonizers which can be distinguished from prior related devices by their efficiency. A more specific object of this invention is to provide ozonizers which have a comparatively high quantity of ozone production per unit of size. Another objective of this invention is to provide ozonizers which are efficient from a power standpoint in that they produce a relatively high quantity of ozone per unit of power consumed.

Further objects of this invention are to provide ozonizers which may be constructed relatively easily, which may be used without difficulty, and which are capable of giving prolonged, reliable performance. Another object of this invention is to teach a method of increasing ozone production in an ozonizer through the use of a catalyst or catalyst system. A still further objective of this invention is to teach the use of a transparent dielectric in a silent ozonizer so as to improve ozone production by permitting reflection of radiation within the ozonizer.

In accordance with this invention these objectives are achieved in ozonizers in which two spaced electrodes are separated by at least one dielectric and in which oxygen or an oxygen containing gas is passed between the electrodes as they are oppositely charged in order to cause the production of ozone. In such an ozonizer it is preferred that the dielectric be transparent so as to permit the passage and reflection of radiation between electrodes. It is also preferred that a catalyst for the production of ozone be located between the electrodes so as to be contacted by oxygen being passed through the ozonizer. Preferably these electrodes and the dielectric are all cylindrical and are arranged so as to create a cylindrical channel. In this construction an inlet and an outlet are provided so as to obtain movement of the gas in the channel in a spiral path.

BRIEF DESCRIPTION OF THE DRAWING

Further details of this invention as well as many advantages of it will be apparent from a detailed consideration of the remainder of this specification, the appended claims and the accompanying drawing in which:

FIG. 1 is a front elevational view of a presently preferred embodiment or form of an ozonizer of this invention;

FIG. 2 is a side elevational view of this ozonizer;

FIG. 3 is a partial cross-sectional view of this ozonizer taken at line 3—3 of FIG. 1.

It will be realized that this invention is not to be limited by the drawing of and the following description of a presently preferred embodiment or form of an ozonizer of this invention. Those skilled in the design and construction of ozonizers will realize that features or principles embodied in the precise ozonizer shown may be easily and conveniently embodied within other differently appearing and differently constructed ozonizers through the use or exercise of routine engineering skill.

DESCRIPTION OF THE PREFERRED EMBODIMENT

In the drawing there is shown a presently preferred embodiment or form of an ozonizer 10 of this invention. This particular ozonizer 10 is of a so-called "silent" type inasmuch as it includes a dielectric tube 12 located between first and second electrodes 14 and 16, respectively. The nature of this tube 12 is considered to be important in achieving preferred results obtainable with the present invention.

The particular tube 12 illustrated is a cylindrical tube having ends 18 and 20 which is formed out of a transparent dielectric material capable of passing at least some radiation generated within the complete ozonizer 10 during the operation of this device. It is preferred to form this particular tube 12 out of a borosilicate glass having a comparatively low temperature coefficient of expansion and a relatively high mechanical strength. Such a glass is resistant to relatively high temperatures without cracking or otherwise deteriorating. Glasses of this type are commonly sold under the trademark "Pyrex." By virtue of such a low coefficient of thermal expansion and the high mechanical strength, such a glass performs satisfactorily in the complete ozonizer 10 which used in the tube 12 without this tube tending to break down to any noticeable extent, even when the complete ozonizer is used over a prolonged period.

The first electrode 14 is employed direct upon the inner surface of the tube 12. Preferably this first electrode 14 is cylindrical and is in intimate contact with the tube 12 so as to avoid the presence of any air pockets or the like between it and the tube 12 since if such defects were present they would tend to lessen the effective life of the complete ozonizer 10.

In obtaining preferred results, it is considered that this first electrode 14 should consist of an inner, inert reflective layer 22 in direct contact with the tube 12 surmounted by another layer 24 of a conductive material which is relatively resistant to oxidation. In order to provide for substantially fairly equal current distribution throughout the electrode 14 a band-like layer of a highly-conductive metal such as copper may be secured to the interior of the layer 24. In order to minimize the possibility of any resistance losses and in order to avoid the possibility of breakdown due to trapped pockets of air these various layers 22, 24 and 26 should preferably be in direct intimate contact with one another.

Presently preferred results have been achieved by making the layer 24 a comparatively thin layer of a so-called "noble" metal such as silver or gold. Such a layer may easily be created by known metal deposition techniques. Such a layer of this type of metal is also comparatively highly reflective. This is considered to contribute to the over-all efficiency of the ozonizer 10. The layer 24 employed is preferably formed out of stainless steel or another similar metal which is relatively resistant to deteriorization due to oxidation. It will be noted that this layer 24 completely covers the layer 22 so as to protect it against damage. To a degree the layer 24 assists the layer 26 in distributing current during the use of the ozonizer 10 so that all parts of the layer 22 are charged to the same potential.

The second electrode 16 is also of a cylindrical shape. It is located directly opposite the first electrode 14 so as to constitute a part of what is referred to herein as a housing structure so that these electrodes 14 and 16 are concentric to one another. This housing structure includes identical end cylindrical tubes 28, each of which has a small shoulder 30 secured to an end of the electrode 16 by means of an appropriate conventional adhesive. These tubes 28 may be formed out of any conveniently available nonconductive material. It is presently preferred to form these out of a rigid polyvinyl chloride composition since such a composition performs satisfactorily in the ozonizer 10 and is relatively inexpensive and easy to work with.

The end 18 of the dielectric tube 12 is secured in place with respect to this tube 12 and one of the tubes 28 by means of a comparatively small grooved spacer ring 32 which may also be constructed of the same material as either of the tubes 28. This spacer ring 32 is also preferably sealed with respect to the tube 28 to which it is attached and to the end 18 of the tube 12 by means of a conventional appropriate adhesive.

The end 20 of the tube 12 is not secured in place in the same manner. Instead it is sealed with respect to and held in place by a conventional elastomeric O-ring 34 which fits tightly between the tube 12 and the portion of the tube 28 adjacent to the end 20. Such an O-ring may be conveniently formed out of any relatively temperature resistant material such as the common silicone rubber. This O-ring 34 in effect forms an expansion joint permitting expansion of the tube 12 and of the second electrode 16 and the tubes 28 during the operation of the ozonizer 10 without causing physical damage to this ozonizer, even if various parts of the ozonizer should expand and contract at different rates.

With the construction described what in effect is a cylindrical channel 36 is defined at the exterior of the tube 12 between the ends 18 and 20 of this tube 12. The outer wall of this channel 36 is defined by the tubes 28 and the second electrode 16. The tubes 28 carry adjacent to their ends remote from the second electrode 16 tangentially directed pipes 38 which lead into the interior of the channel 36. These pipes 38 may be formed of the same material as the tubes 28 and may be secured in place on them through use of an appropriate conventional adhesive.

Either of the pipes 38 may be used as an inlet or an outlet for the gas to be processed within the ozonizer 10 during the use of this device. When one of the pipes 38 is so used, the gas entering the channel 36 will tend to swirl around the entire interior of the channel 36 in a spiral type of path and will leave the channel 36 by the other of the pipes 38. This is also considered to be important in attaining the greatest possible efficiency in the use of the ozonizer 10. By virtue of this type of gas movement there is a tendency for centrifugal force to bring any gas being moved through the ozonizer 10 into contact with the surface 40 of the second electrode exposed to the interior of the channel 36.

With a preferred ozonizer 10 of this invention this entire electrode 16 is formed out of a metal which is considered to have a catalyst type of effect to promote the production of ozone. Metals belong to the transition elements are capable of exhibiting this type of catalyst action. It is considered that effective catalyst results can be achieved using the metals titanium, zirconium and hafnium belonging to Group IV$a$ of the Periodic Table; the metals vanadium, nyobium and tantalum belonging to Group V$a$ of the Periodic Table; and the metals chromium, molybdenum and tungsten belonging to Group VI$a$ of the Periodic Table. Of these metals it is considered that the metals titanium, vanadium, molybdenum and tungsten are capable of serving most satisfactorily as a second electrode 16. Presently preferred results have been achieved utilizing titanium as the second electrode 16. Alloys of these various metals can of course be employed. Since these metals are indicated herein because of their catalyst effect, they may be used solely as a surface covering for another base metal in a composite electrode 16.

This catalyst effect obtained in accordance with this invention can also be obtained with various oxides of metals such as are indicated. Thus, for example, the presence of titanium dioxide within any ozonizer between the electric of such a device where contacted by the gas moving through the ozonizer is to be considered to materially increase the total efficiency of ozone production within such a device. Various oxides as are herein indicated can be located in the path traversed by the gas between the electrodes in such an ozonizer in any convenient way. With the particular ozonizer 10 during the operation of the device a thin coating of an oxide such as is herein described will normally develop automatically from the operation of the device on the surface of an exposed electrode such as a titanium electrode.

During the operation of the ozonizer 10 preferably the electrodes 14 and 16 are connected to an appropriate circuit a a relatively high frequency as a gas containing oxygen is passed through the device either by being pressurized or by being pulled through the ozonizer 10 through the use of a partial vacuum. As this occurs provided the voltage applied to the electrodes 14 and 16 is sufficiently high, ozone will be produced in such a gas.

When the ozonizer 10 is operated in a preferred manner the precise voltage applied should be sufficiently high so that the entire interior of the ozonizer 10 will take on a bluish type of appearance because of radiation generation without any scintillation or arcing taking place between the electrodes 14 and 16. Thus, the voltage used should be just below the voltage at which physical breakdown will take place in the tube 12. This voltage will of course vary depending upon a number of factors such as the physical dimensions of any precise ozonizer 10 and the parts within it and such as the physical characteristics and properties of the tube 12. This maximum permissible voltage will also vary somewhat depending upon the nature of a particular gas passed through the ozonizer and the rate at which such gas is moved through the interior of this ozonizer.

It is preferred to operate the ozonizer 10 in the manner described in the aforenoted Miller application Ser. No. 501,954 filed Oct. 22, 1965, now U.S. Pat. 3,455,803, entitled "Ozone Producing Apparatus and Method" that in effect this ozonizer 10 is caused to resonate at a resonance frequency. This is considered to materially increase the efficiency of ozone production. In the interest of brevity, the entire disclosure of this Miller application is incorporated herein by reference. It is to be understood, however, that the ozonizer 10 is very efficient for the production of ozone when it is operated in other manners as indicated by various publications and patents showing the production of ozone from an ozonizer.

The overall efficiency of the ozonizer 10 is considered to be related to virtually every facet of its construction. It is constructed so that the possibility of physical breakdown within this device are effectively minimized. This is particularly the case if various cooling fins 42 are attached to the electrodes 16 so as to aid in dissipating heat which might provoke breakdown developed within the interior of the ozonizer 10 during its utilization. The fins 42 shown may be attached directly to the electrodes 16. Other equivalent cooling means can be employed.

The effectiveness and overall efficiency of the ozonizer 10 is to a significant degree related to the fact that the tube 12 used is transparent and the fact that the reflective layer 22 serves much in the manner of a common mirror to reflect back and forth radiation developed within this ozonizer as it is employed. To a degree the second electrode 16 also serves this function in this device. This serves to concentrate the radiation within a comparatively small limited area where ozone is actually produced. Within this area the gas being treated contacts the second electrode 16 so as to obtain the benefits of catalyst action promoting ozone production. Centrifugal force acting on the gas being treated is considered to promote catalyst contact and further to tend to concentrate certain types of molecules and/or free radicals at the surface of the electrode 16 so as to most effectively contribute to ozone production.

It will be realized by those skilled in the art that various individual features contributing to the desirability of the ozonizer 10 may be utilized in other ozonizers not employing all of the features of this ozonizer. Thus, for example, catalysts as herein described may be employed with other more conventional ozonizers. Similarly a transparent dielectric so as to obtain transmittal of some degree of reflection of the Corona type of radiation developed in an ozonizer may be employed in other different types of ozonizers than the precise ozonizer 10 shown.

When the ozonizer 10 is operated in the preferred manner this ozonizer is quite efficient on a comparative basis in the production of ozone. This, however, does not completely indicate the effectiveness of this ozonizer 10. When it is operated in the preferred manner it appears to produce a different form of ozone than is commonly produced by other ozonizers. Thus, the ozone produced from air obtained from this ozonizer 10 when it is operated in the preferred manner will raise the pH of water instead of lowering it as conventional ozone produced from air using a conventional ozonizer will do. The type of ozone produced with the ozonizer 10 in its preferred manner of utilization also will accomplish a number of beneficial effects which cannot be achieved with the conventional form of ozone.

It is, of course, to be recognized that the ozonizer 10 can be used with other than oxygen or oxygen containing gas in order to cause various reactions which will depend upon the fluid treated. Because of the nature of this invention and the fact that various features or aspects of it can be utilized in various ways it is to be considered to be limited solely by the apppended claims forming a part of this disclosure.

What is claimed is:

1. In a silent ozonizer which has first and second spaced electrodes and a dielectric is positioned between said electrodes and in which oxygen is passed between said second electrode and said dielectric as said electrodes are charged in order to cause the production of ozone from oxygen by the electric field created by the charged electrodes, the improvement which comprises:
   said second of said electrodes being a titanium electrode,
   said dielectric being transparent to radiation between said electrodes produced as a result of the operation of said ozonizer to produce ozone,
   said first electrode being located against said dielectric and acting as a reflector for said radiation.

2. An ozonizer as claimed in claim 1 wherein:
   said second electrode is coated with a coating of titanium oxide on the surface thereof adjacent to the said dielectric.

3. In a silent ozonizer which has first and second spaced cylindrical electrodes and a dielectric cylinder positioned between said electrodes so as to define a tubular channel between said second electrode and said dielectric cylinder and in which oxygen is passed as said electrodes are charged in order to cause the production of ozone from oxygen by the electric field created by the charged electrodes, the improvement which comprises:
   housing means positioned around said dielectric cylinder so as to define means enclosing the ends of said tubular channel,
   said housing means including inlet and outlet means leading into said tubular channel adjacent to the opposite ends thereof,
   said inlet and outlet means being located tangentially with respect to said tubular channel so that a gas may be introduced into one end of said tubular channel through said inlet means and will move in a spiral path through said tubular channel to the other end of said tubular channel and will pass out of said outlet means.

4. In a silent ozonizer which has first and second spaced cylindrical electrodes and a dielectric cylinder positioned between said electrodes so as to define a tubular channel between one of said electrodes and said dielectric in which oxygen is passed as said electrodes are charged in order to cause the production of the ozone from oxygen by the electric field created by the charged electrodes, the improvement which comprises:
   said one of said electrodes being a titanium electrode,
   housing means positioned around said dielectric cylinder so as to define means enclosing the ends of said tubular channel,
   said housing means including inlet and outlet means leading into said tubular channel adjacent to the opposite ends thereof,
   said inlet and outlet means being located tangentially with respect to said tubular channel so that a gas may be introduced into one end of said tubular channel through said inlet means and will move in a spiral path through said tubular channel to the other end of said tubular channel and will then pass out of said outlet means.

5. An ozonizer as claimed in claim 4 wherein:
   said second electrode is coated with a coating of titanium oxide on the surface thereof adjacent to the said dielectric.

References Cited

UNITED STATES PATENTS

| | | | | |
|---|---|---|---|---|
| 1,991,668 | 2/1935 | Hartman | | 204—319 |
| 1,994,462 | 3/1935 | Bueno | | 204—314 |
| 2,191,797 | 2/1940 | Matheson | | 204—320 |
| 2,822,327 | 2/1958 | Hammesfahr et al. | | 204—320X |
| 3,010,892 | 11/1961 | Axt | | 204—322 |
| 3,442,788 | 5/1969 | Wooten et al. | | 204—317 |

JOHN H. MACK, Primary Examiner

N. A. KAPLAN, Assistant Examiner

U.S. Cl. X.R.

204—176